United States Patent
Swanson et al.

(10) Patent No.: US 8,755,941 B2
(45) Date of Patent: Jun. 17, 2014

(54) MODEL BASED TEMPERING AIR CONTROL AND ENHANCEMENT OF EXHAUST FOR SELECT CATALYTIC REDUCTION

(75) Inventors: Larry William Swanson, Laguna Hills, CA (US); Douglas Frank Beadie, Greer, SC (US); Neil Colin Widmer, San Clemente, CA (US); Hua Zhang, Greer, CA (US); Gilbert Otto Kraemer, Greer, SC (US)

(73) Assignee: General Electric Company, Schenectady, NY (US)

( * ) Notice: Subject to any disclaimer, the term of this patent is extended or adjusted under 35 U.S.C. 154(b) by 869 days.

(21) Appl. No.: 12/874,333

(22) Filed: Sep. 2, 2010

(65) Prior Publication Data
US 2012/0058013 A1 Mar. 8, 2012

(51) Int. Cl.
*B01D 53/94* (2006.01)
(52) U.S. Cl.
USPC .......... 700/274; 700/9; 700/28; 700/29; 700/30; 700/32; 700/33; 700/34; 700/266; 700/282; 700/289; 701/36; 701/37; 701/99; 702/22; 702/23; 702/24; 702/30; 702/31; 702/32; 60/723; 60/39.5; 60/285; 60/287; 60/299; 60/300; 60/301; 60/302; 422/109
(58) Field of Classification Search
USPC ........... 700/9, 28, 29–34, 266, 274, 282, 289; 701/36, 37, 99; 702/22, 23, 24, 30–32; 60/723, 39.5, 285, 287, 299–302; 422/109
See application file for complete search history.

(56) References Cited

U.S. PATENT DOCUMENTS

| | | | |
|---|---|---|---|
| 5,493,631 A * | 2/1996 | Huang et al. ............... 706/23 |
| 5,576,970 A | 11/1996 | Goto | |
| 5,822,740 A * | 10/1998 | Haissig et al. .................. 706/3 |
| 6,098,011 A | 8/2000 | Scott | |
| 6,446,430 B1 * | 9/2002 | Roth et al. ..................... 60/286 |
| 6,532,454 B1 * | 3/2003 | Werbos ........................... 706/14 |
| 6,882,929 B2 | 4/2005 | Liang et al. | |
| 7,069,716 B1 | 7/2006 | Childers | |
| 7,469,092 B2 * | 12/2008 | Sappey et al. ................ 385/147 |
| 2004/0109800 A1 * | 6/2004 | Pahlman et al. .............. 423/210 |
| 2006/0045802 A1 | 3/2006 | Boyden et al. | |
| 2007/0214777 A1 * | 9/2007 | Allansson et al. .............. 60/299 |
| 2009/0142243 A1 * | 6/2009 | Eiteneer et al. ............ 423/239.1 |

FOREIGN PATENT DOCUMENTS

EP 0604236 A1 6/1994
EP 0604236 B1 4/1997

* cited by examiner

*Primary Examiner* — Shogo Sasaki
(74) *Attorney, Agent, or Firm* — Cooper Legal Group, LLC

(57) ABSTRACT

A method and system for controlling a temperature of an exhaust gas being introduced to a catalyst is provided. Using an adjustable flow controller, an adjustable amount of tempering fluid is provided to the exhaust gas prior to the exhaust gas proceeding to the catalyst. A sensor senses a parameter indicative of a temperature of the exhaust gas being introduced to the catalyst. A computer processor uses a relationship to relate the parameter to an adjustment of the adjustable flow controller that will adjust the amount of tempering fluid provided to the exhaust gas and change the temperature of the exhaust gas being introduced to the catalyst toward a target temperature. Adjustment of the adjustable flow controller is initiated by the computer processor to change the flow of the tempering fluid, and the relationship between the parameter and the adjustment of the adjustable flow controller is updated.

12 Claims, 5 Drawing Sheets

MODEL BASED TEMPERING AIR CONTROL AND ENHANCEMENT OF EXHAUST FOR SELECT CATALYTIC REDUCTION

BACKGROUND OF THE INVENTION

1. Field of the Invention

The invention relates to the control of flue gas temperature, and specifically relates to a method and system for establishing a substantially-uniform temperature of a flue gas from a gas turbine.

2. Discussion of Prior Art

Gas turbines have traditionally been used to drive loads such as an electric generator to generate electric power. In operation, gas turbines compress air to an elevated pressure and combine that air with fuel in a combustion chamber. The fuel/air combination is combusted to produce a high-pressure, high-velocity flue gas that travels over a series of turbine blades to rotate a shaft before being exhausted from the gas turbine.

At least some of the fuel introduced into the combustion chamber is exhausted without being fully combusted, forming undesirable emissions such as oxides of nitrogen (generally abbreviated as $NO_x$) for example, which can be harmful to the environment. To reduce the amount of such undesirable components in the flue gas emitted by gas turbines, the flue gas has been subjected to a process referred to as Selective Catalytic Reduction ("SCR"). The SCR process involves introducing the flue gas to a reactant in the presence of a catalyst to achieve a reduction of $NO_x$ into less-harmful products. The high temperatures of the flue gas to which the catalyst is exposed, however, can deactivate the catalyst over time, requiring frequent replacement of the catalyst to effectively reduce the amount of $NO_x$ emitted by the gas turbine. Another high temperature limit is the temperature at which the reducing agent such as ammonia is oxidized producing $NO_x$. Reducing the tempering air addition reduces operational cost as long as catalyst life and other considerations are accounted for.

Previous attempts to cool the flue gas before being exposed to the catalyst have involved delivering a cooling agent to the flue gas upstream of the catalyst. Generally, a static and predetermined stream of the cooling agent has traditionally been injected into the flue gas during operation of the gas turbine, regardless of the operating conditions. However, modern gas turbines will operate under a variety of conditions, emitting a varying flue gas based on those conditions, requiring different levels of the cooling agent to effectively cool the flue gas. Simple cycle gas turbines do not have steam cooling circuits to cool the gas turbine exhaust gases before the $NO_x$ abatement catalyst system. Air addition is a common method to reduce the exhaust temperature to an acceptable value before the $NO_x$ catalyst system.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides a method of controlling a temperature of a flue gas being emitted from an engine and introduced to a catalytic system including a catalyst for promoting a reaction to reduce an amount of an undesirable combustion product emitted to an ambient environment. The method includes using an adjustable flow controller to provide an adjustable amount of tempering fluid to the exhaust gas prior to the exhaust gas proceeding to the catalyst. A sensor senses a parameter indicative of a temperature of the exhaust gas being introduced to the catalyst. A computer processor uses a relationship to relate the parameter to an adjustment of the adjustable flow controller that will adjust the amount of tempering fluid provided to the exhaust gas and change the temperature of the exhaust gas being introduced to the catalyst toward a target temperature. Adjustment of the adjustable flow controller is initiated by the computer processor to change the flow of the tempering fluid, and the relationship between the parameter and the adjustment of the adjustable flow controller is updated.

Another aspect of the invention provides a system for reducing an amount of an undesirable combustion product in an exhaust gas emitted from an engine. The system includes a catalytic surface to be exposed to the exhaust gas being emitted from the engine for promoting a reaction to convert at least a portion of the undesirable combustion product into a product suitable to be released into an ambient environment of the system. The exhaust gas flows through an intake manifold before being introduced to the catalytic surface. A plurality of nozzles are disposed adjacent to the intake manifold for introducing a tempering fluid at a plurality of different locations within the exhaust gas. A plurality of flow controllers are in fluid communication with the nozzles for regulating introduction of the tempering fluid from the nozzles to the exhaust gas being emitted from the engine. The flow controllers are adjustable to regulate the introduction of the tempering fluid to the exhaust gas upstream of the catalytic surface. A sensor array monitors a parameter indicative of a temperature difference between the exhaust gas being introduced to a plurality of different portions of the catalytic surface. A controller, which includes a computer processor and a non-transitory computer-readable memory, is operable to relate the parameter sensed by the sensor array to an adjustment of one or more of the flow controllers based on information stored in the computer-readable memory to adjust introduction of the tempering fluid into exhaust gas and reduce the temperature difference. The computer processor updates the information stored in the computer-readable memory relating the parameter to the adjustment of the one or more flow controllers based on the monitoring of the parameter by the sensor array.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
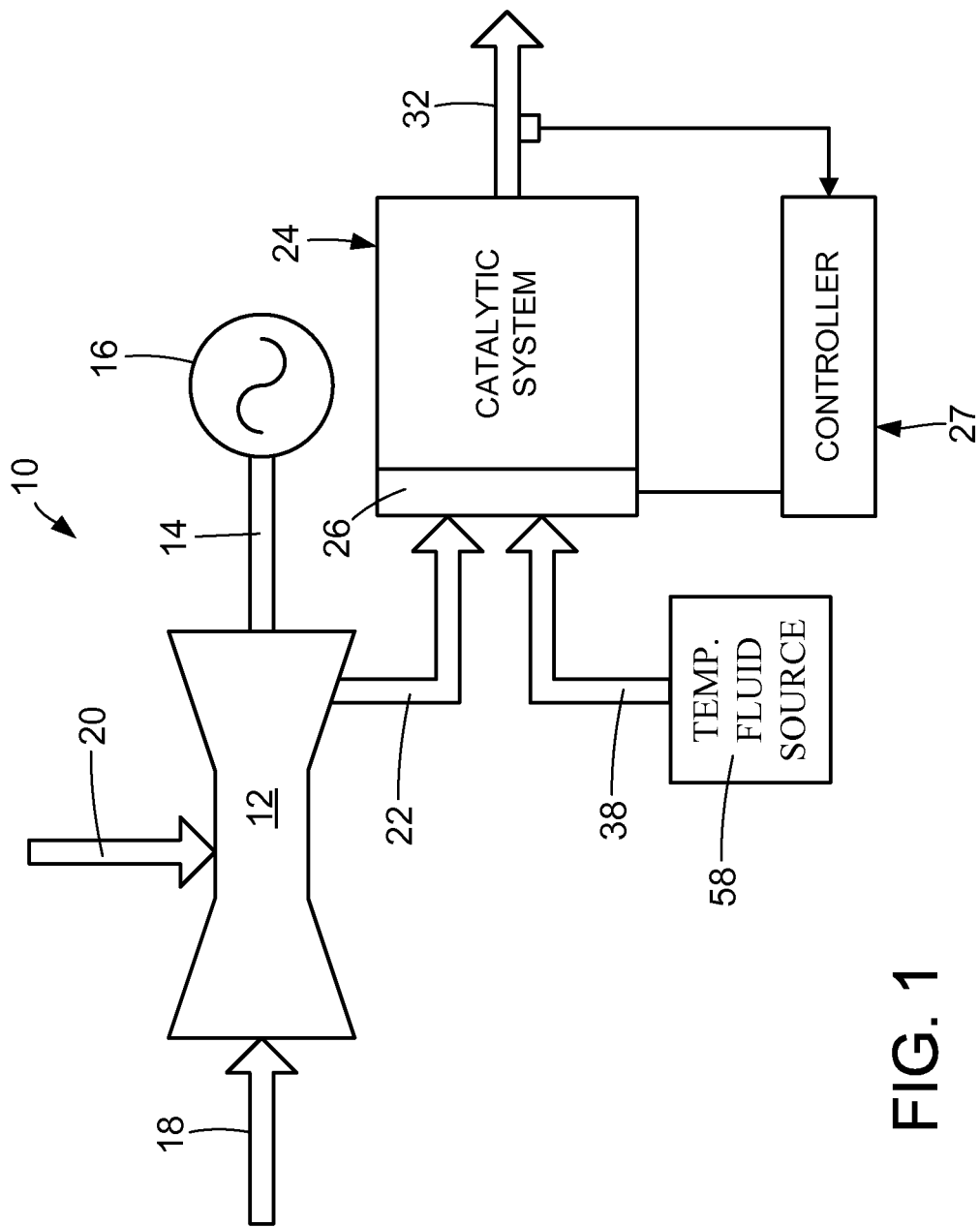
FIG. 1 is a schematic representation of an illustrative embodiment of a power generation system for generating electric power and which shows an example of a heat-producing device, such as a turbine engine, operatively connecting exhaust gas to a catalytic system.

Illustrative embodiments that incorporate one or more aspects of the invention are described and illustrated in the drawings. These illustrated examples are not intended to be overall limitations on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An example of a power generation system 10 for generating electric power is schematically illustrated in FIG. 1. As shown, the generation system 10 includes an engine 12 in the form of a gas turbine engine for rotating a shaft 14 that is operatively connected to drive a generator 16 to generate the electric power. Briefly, air 18 (represented by a schematic arrowhead) and a combustible hydrocarbon fuel 20 (represented by a schematic arrowhead) are introduced to the engine 12, where they are combined and combusted to generate the rotational force imparted on the shaft 14 in a well known 28 manner.

An exhaust gas 22, which can also be considered to be a flue gas, is produced from the combustion. The exhaust gas 22 contains undesirable combustion products such as oxides of nitrogen ("$NO_x$"), each of which may not be desired. The exhaust gas 22 is directed to a catalytic system 24 within which a reaction occurs to reduce the amount of the $NO_x$, and/or other undesirable combustion products, present within a final gas 32 (see FIG. 2) proceeding from the catalytic system 24 along a stack 36 and out from an exhaust port 34 to the ambient atmosphere. It is to be noted that dimensions of the stack 36 are reduced to fit within the drawing figure and thus do not accurately represent actual dimensions.

It is to be appreciated that the exhaust gas 22 is at an elevated temperature as compared to ambient atmospheric temperature. Moreover, such elevated temperature of the exhaust gas may be at a highest level as the exhaust gas 22 proceeds from the engine 12 to the catalytic chamber 28. For ease of discussion, such exhaust gas is simply considered to be heated or hot.

It is to be appreciated that the generation system 10 is one example that includes a device that produces heated exhaust gas. Other such devices, such as combustion boiler, produce heated exhaust gas. The exhaust gas could be gas resulting from a variety of combusted materials (e.g., various fuels) and such exhaust gas could be proceeding along an exhaust flue pathway or the like. As should be appreciated upon further reading, the present invention relates broadly to such a device that produces heated exhaust gas. Only the presented example with a turbine engine is described in detail for the sake of brevity. However, as should be appreciated, the present invention may be utilized in connection with other devices that produce heated exhaust gas (e.g., any type of engine or other combustion device such as a boiler).

Figure 2:
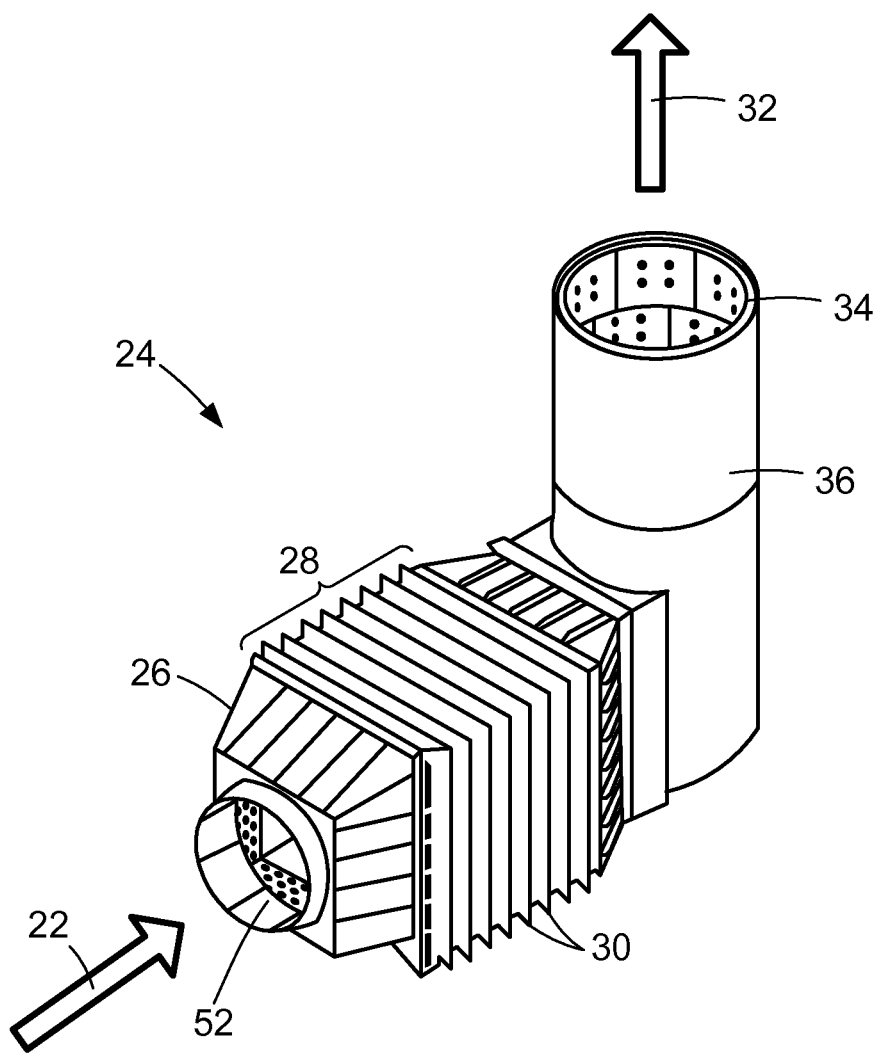
FIG. 2 is a perspective view of an illustrative embodiment of an example of the catalytic system shown in FIG. 1 for reducing an amount of an undesirable combustion product from the gas emitted from the engine, with the catalytic system including an intake manifold.

With attention to FIG. 2, which includes a perspective view of an example of the catalytic system 24, exhaust gas 22 from the engine 12 (FIG. 1) is introduced to the catalytic system 24 through an intake manifold 26 that is disposed upstream of a catalytic chamber 28. It is to be appreciated that a first location being described as "upstream" of a second location herein means that the first location is encountered by the exhaust gas 22 before the second location is encountered by the exhaust gas 22 as the exhaust gas 22 is traveling in a direction from the engine 12 to the catalytic system 24 and so on. Likewise, the second location encountered by the exhaust gas 22 after the first location is said to be "downstream" of the first location.

The catalytic chamber 28 houses a plurality of catalytic surfaces, which in FIG. 2 are represented by a plurality of substantially-planar catalytic beds 30. Each of the catalytic beds 30 extends through the catalytic chamber 28 in a direction that is transverse (e.g., substantially perpendicular) to the direction in which the exhaust gas 22 enters the catalytic chamber 28 through the intake manifold 26. Of course, the catalytic chamber 28 is merely an example and other configurations are possible. Ammonia, urea, hydrocarbons, or any other suitable reducing agent for reduction of the $NO_x$ into products such as nitrogen ($N_2$) and water ($H_2O$), for example, that are less-harmful to the environment than $NO_x$, is injected or otherwise introduced to the exhaust gas 22 upstream of the catalytic beds 30 to promote the catalyst action. After being introduced to the catalytic surfaces of the catalytic beds 30 and reduced to the less-harmful products, those less-harmful products, and possibly a small amount of the $NO_x$ relative to the amount of $NO_x$ present in the exhaust gas 22 and other byproducts, are vented from the catalytic system 24 as the treated or relatively "clean" final gas 32 through the exhaust port 34 of the stack 36.

The catalytic material of the catalytic beds 30 may perform their function with greater efficiency if temperature is kept generally close to a certain temperature or at least within a range of certain temperatures. In addition or in the alternative, degradation of the catalytic beds 30 may be reduced or avoided if temperature is kept generally close to a certain temperature or at least within a range of certain temperatures. Likewise, the exhaust gas temperature is controlled to reduce oxidation of the reducing agent into undesirable products such as oxidation of ammonia to $NO_x$. Such certain temperature or range of certain temperatures is a temperature target. The temperature/range target can be different dependent upon catalytic material, content of exhaust gas to be catalyzed, etc.

Additionally, catalytic material consumption can be controlled by exposing the catalytic material to flue gas having a substantially-uniform temperature across the surface of the catalytic bed 30. Relatively hot flue gas degrades the performance of the catalytic material in that region over time quicker than a relatively cool flue gas. Thus, regions of the catalytic bed 30 such as the central region, for example, that are exposed to the relatively hot flue gas will have their catalytic performance diminished quicker than regions exposed to the relatively cool flue gas, such as perimeter regions of the catalytic bed 30. Introducing flue gas with a temperature approaching a substantially-uniform temperature across the catalytic surface can promote substantially-even catalyst degradation across the catalytic bed.

One aspect of the present invention provides a method and associated system in which tempering fluid 38 (see FIG. 3) is introduced to the exhaust gas 22 to temper or moderate the temperature of the exhaust gas 22. With reference to the presented example, the present invention includes the specific aspect of tempering air, as the fluid, being introduced to the exhaust gas 22. The tempering air is introduced to the exhaust gas 22 within the intake manifold 26. The addition of the tempering air is in the presence of ammonia, or other, catalyst to reduce the amount of $NO_x$ in the exhaust gas 22. As such, the tempering fluid 38 is used to reduce exhaust gas temperature at the catalytic beds 30 via its addition to the exhaust gas prior to the exhaust gas flowing over the catalytic beds 30. However, it is to be understood that the invention is not so limited by this example. The catalyst material is typically related to the components being targeted within the exhaust gas and thus a different catalyst material may be used. Also, the present example utilizes air as the tempering fluid 38. Other types of tempering fluid (e.g., other gases) may be utilized. Also, a different location for introduction of the tempering fluid is possible. Again, only the illustrative embodiment is described in detail for the sake of brevity.

Figure 3:
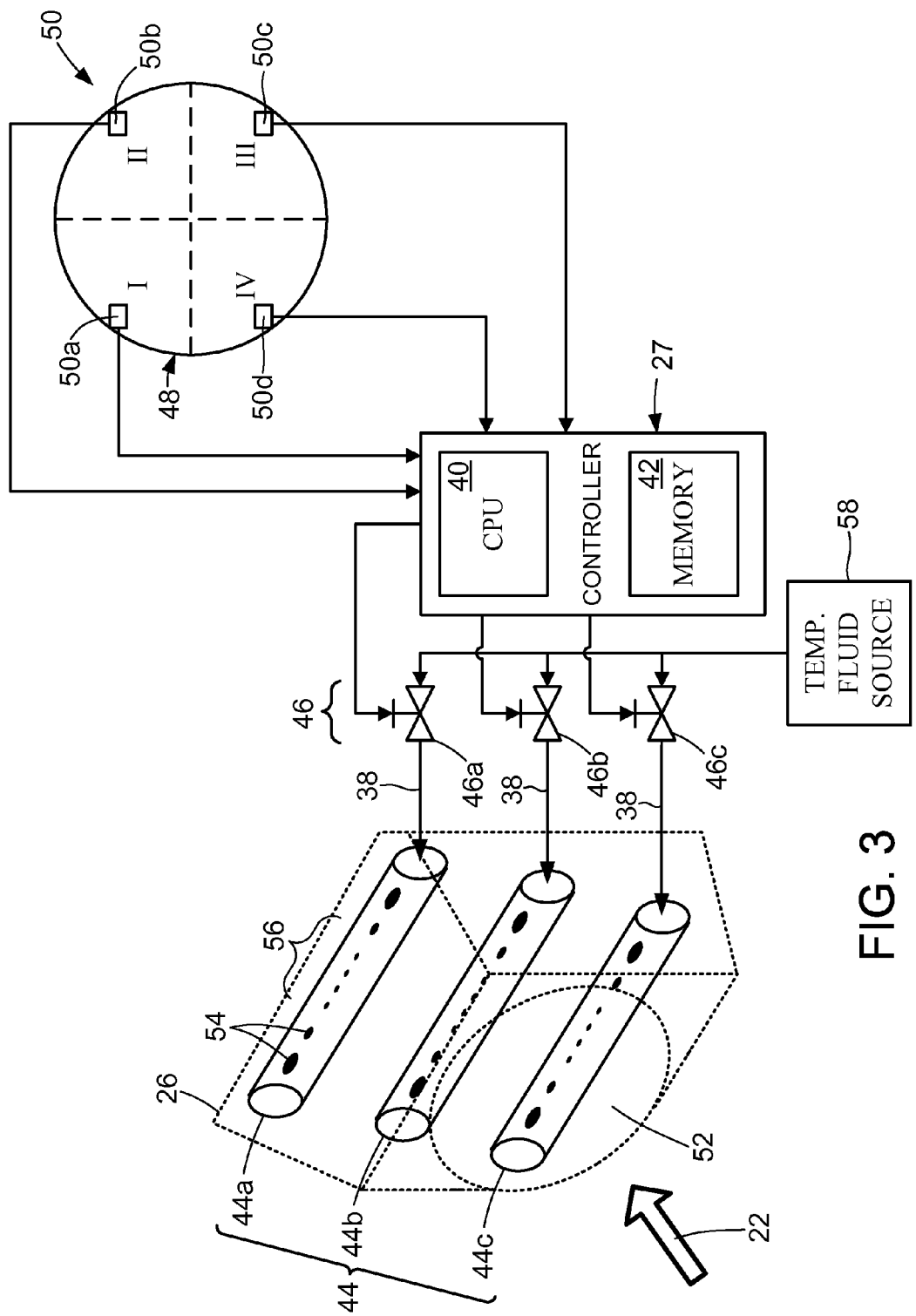
FIG. 3 is a schematic representation of an interior of an embodiment of the intake manifold shown in FIG. 2 with structure for introduction of a tempering fluid to the flue gas, and also shows flow controllers for regulating the introduction of the tempering fluid under the control of a controller in accordance with an aspect of the present invention.

FIG. 3 includes a schematic view into an example structure located within the interior of the intake manifold 26. Such manifold structure includes a plurality of nozzles 44. Within the shown example, the nozzles 44 extend laterally across substantially the entire extent of an aperture 52 through which the tempering fluid 38 enters the catalytic chamber 28. Also with the shown example three nozzles 44a, 44b and 44c are shown. It is to be appreciated that such configurations are merely examples and that different configurations are possible (e.g., different nozzle positions and/or different number of nozzles). The flow rate of tempering fluid being introduced to the exhaust gas 22 within the intake manifold 26 can be controlled within the intake manifold 26 to distribute the flow appropriately, in addition to controlling the distribution of the flow of tempering fluid amongst the nozzles 44, by use of additional control valves not shown, to achieve the desired temperature uniformity across the entire catalyst inlet face.

Each nozzle 44 includes a plurality of apertures 54. The apertures 54 may have any configuration. For example, the apertures 54 can be spaced along the extent of the nozzles 44. Also, the apertures 54 located near a central portion 56 of the nozzles 44 may have smaller dimensions than the apertures 54 located away from the central portion 56 as shown in FIG. 3, or the apertures 54 located near a central portion 56 of the nozzles 44 may have larger dimensions than the apertures 54 located away from the central portion 56. Alternate embodiments include a plurality of apertures 54 having substantially-similar dimensions along the nozzles 44. Also, the apertures 54 located near the central portion 56 of the nozzles 44 may be spaced further from adjacent apertures 54 than the spacing of the apertures 54 located away from the central portion 56, may be spaced closer to adjacent apertures 54, or may be evenly distributed. In general, the construction and configuration of each nozzle may be varied and the shown nozzles are merely examples. Further, adjustment of the introduction of tempering fluid can occur vertically (i.e., by varying the flow of tempering fluid through one of the nozzles 44 relative to the flow of tempering fluid through another of the nozzles 44), transversely (i.e., by varying the flow of tempering fluid through one or more of the apertures 54 relative to the flow of the tempering fluid through one or more other apertures 54 in the same nozzle 44), or a combination thereof.

A supply 58 of the tempering fluid 38 is provided. With the tempering fluid 38 being air, the supply 58 is either a compressed air source or other means to provide a flow of air. The supply 58 and thus the tempering fluid 38 are relatively cool (e.g., at a temperature less than the temperature of the exhaust gas 22). The tempering fluid supply 58 is operatively connected to the nozzles 44. Tempering fluid 38 that flows from the apertures 54 of the nozzles 44 is mixed with the exhaust gas 22 within the intake manifold 26 and thus cools the exhaust gas. Since the tempering fluid 38 is mixed prior to the exhaust gas reaching the catalytic beds 30, the catalytic bed can be retained at/near a desired temperature/temperature range dependent upon the amount (e.g., volume) and distribution of tempering fluid 38 provided.

The tempering fluid supply 58 is operatively connected to the nozzles 44 via flow controllers 46a, 46b and 46c (the flow controllers are generically identified herein as 46). In general each flow controller 46 is a valve or metering device that is operable (e.g., adjustable) to regulate an amount of tempering fluid 38 that passes and proceeds from the supply toward the respective nozzle 44. Accordingly, the flow controllers 46 are each adjustable to introduce a varying quantity of the tempering fluid 38 to the exhaust gas 22 through the nozzles 44. The number of flow controllers 46 in the shown example corresponds to the number of nozzles 44. It is to be appreciated that a different number of flow controllers 46 may be varied.

Also, the flow controllers 46 are operatively connected to a controller 27 for control of the flow controllers 46. Thus, the controller 27 is for control of regulation of the introduction of the tempering fluid 38 to the exhaust gas 22. The controller can be any type of electronic device for processing input data and providing output (control) signals. Within the shown example, the controller 27 includes a processor 40 (FIG. 3), which can be a central processing unit (CPU), and a non-transitory computer-readable memory 42 storing computer-executable instructions that, when executed by the processor 40, cause the controller 27 to perform a method such as that describe herein. As such, the controller 27 may be considered to be a computerized controller. The optimized control valve settings, established during the initial gas turbine setup at various loads, could serve as an initial basis for subsequent optimization of air distribution. Accordingly, weighting factors, coefficients, and other settings for controlling adjustments of the valves 46 based on a sensed parameter to establish a substantially-uniform temperature of the exhaust gas 22 reaching the catalytic bed 30 can be assigned an initial value, and those initial values subsequently optimized by the controller 27 in real time during operation of the engine 12.

Exhaust gas 22 passing through the intake manifold 26 passes over the nozzles 44, entraining tempering air 38 being introduced into the intake manifold 26 through the nozzles 44. Since each of the separate nozzles 44a, 44b and 44c can be operatively connected to its own dedicated flow controller 46a, 46b and 46c, respectively, the quantity of tempering air introduced to the exhaust gas 22 in the intake manifold 26 upstream of the catalytic surface via the nozzles 44 can be independently regulated by the controller 27.

The controller 27 (FIG. 3) is also operatively connected to a sensor array 50. The sensor array 50 is located downstream of the catalytic chamber 28. In the shown example, the sensor array 50 is arranged at the exit portion of the catalytic system 24 within a cross section 48 of the stack 36. However, the sensory array 50 can be arranged as desired to sense the one or more parameters indicative of the temperature of the flue gas being introduced to a catalytic bed 30. The sensor array 50 includes a plurality of sensors 50a, 50b, 50c and 50d arranged to monitor temperatures of the flowing gas at different locations. The example shows four sensors within the sensor array 50, and the sensors 50a, 50b, 50c and 50d are arranged downstream of the catalyst chamber 28. But it is contemplated that a different number of sensors could be utilized, at different locations upstream or downstream of the catalytic bed 30. The sensors 50a, 50b, 50c and 50d can be any suitable sensor for detecting any parameter that is indicative of a temperature deviation between different locations on the catalytic surface. For example, each of the sensors 50a, 50b, 50c and 50d can be independently selected to be a temperature sensor, composition sensor for detecting an amount of $NO_x$ or other component, or any other suitable sensor. Moreover in the shown example, the sensors 50a, 50b, 50c and 50d are arranged in a plane that lies in a planar cross-section 48 of the exit portion of the catalytic system 24 that is substantially perpendicular to the direction in which the clean, final gas 32 (FIG. 2) proceeds from the catalyst beds toward the stack 36.

Each of the sensors of the sensor array 50 senses the temperature of gas proceeding from the catalytic surfaces of the catalytic beds 30. The sensors in the sensor array 50 are spaced apart from each other to monitor temperatures for different localities within the gas stream. Such different localities are related to different portions the catalytic beds. Some portions of the catalytic beds 30 may be prone or susceptible to be at higher temperatures than other portions of the catalytic beds.

Turning to the example shown within FIG. 3, a cross section 48 of the stack 36 in the embodiment shown in FIG. 2 through which the final gas 32 exits the catalytic system 24 has been divided into four zones I, II, III and IV. The zones I, II, III and IV are not necessarily physically separated from each other in the stack 36 (FIG. 2), but can be theoretically divided from each other (i.e., without physical partitions) for the purpose of monitoring a parameter in each zone with an array of sensors 50a, 50b, 50c and 50d (FIG. 3), with at least one sensor arranged to monitor the parameter in each of the different zones I, II, III and IV, respectively. As described in detail below, a computer fluid flow model stored in the computer-readable medium 42 (FIG. 3) can be used by the processor 40 to relate the temperature sensed in each zone I, II, III and IV to the temperature on the surface of a catalytic bed 30, for example. Of course, this example is not a limitation upon the present invention. Also, it is to be appreciated that the example is merely to show the concept of multiple zones. The zones can have different shape and/or number. Also, the zones may be overlapping.

Temperature information transmitted from the sensors 50a, 50b, 50c and 50d to the controller 27 is utilized to determine adjustments of one, or a combination of more than one of the flow controllers 46. For example the computer-readable memory 42 can store data from the sensor array 50 along with computer-executable instructions that, when executed, cause the processor 40 to control the introduction of tempering air according to the method described in detail below. As described more fully below, the sensors within the sensor array 50 transmit information indicative of temperature deviations or differences within the exhaust gas 22 at different locations across the catalytic surface. The information transmitted from the sensor array 50 is received by the controller 27 which, in turn, executes an adjustment of the flow of tempering fluid 38 being introduced to the exhaust gas 22 through one or more of a plurality of nozzles (generally identified as 44 in FIG. 3) in an attempt to resolve the temperature deviation and establish a substantially-uniform temperature across the catalytic surface of one or more of the catalytic beds 30 (FIG. 2). As such, the controller 27 adjusts the flow of tempering air introduced to the exhaust gas 22 through one or more of the nozzles 44 to establish a desired temperature target.

Each time an adjustment is made to one or more of the flow controllers 46 to bring about a resolution of a temperature deviation, one or more of the sensors 50a, 50b, 50c and 50d can continue to monitor the parameter, and transmit this additional information back to the controller 27. The controller 27 can update information stored in the computer-readable memory 42 to reflect the result of the adjustment of the one or more flow controllers 46, as sensed by the one or more of the sensors 50a, 50b, 50c and 50d in real time. Thus, if a first adjustment of the one or more flow controllers 46 did not adequately resolve the temperature deviation, or conversely, made the temperature deviation more profound, this information can be used to update a formula, table, or other relationship between the adjustment and the temperature deviation at the catalytic surface. When faced with a similar temperature deviation in the future, a subsequent temperature deviation is detected based on sensing of the parameter indicative of such a deviation by the one or more of the sensors 50a, 50b, 50c and 50d, a subsequent, more-corrective adjustment of the same, or a different one of the one or more flow controllers 46 can be made based on the previous results of such adjustments. Thus, the controller 27 is said to be capable of "learning" in that it controls adjustments of flow controllers based on the results of previous adjustments that were used to update a model or other relationship stored in a computer-readable memory 42.

With regard to the presented illustrative system it is to be appreciated that variations are contemplated and are to be considered to be within the scope of the invention. For example, temperature sensing can be performed at a different location. For example, temperature sensing can occur, prior to the introduction of tempering fluid 38, or subsequent to the introduction of tempering fluid but prior to the catalytic beds 30. Moreover the sensors in shown example could be subset of the temperature measurements obtained during system setup and calibration. Other temperature measurements such as IR camera(s) or IR sensor(s) may be employed to infer the temperature distribution based on the IR emissions from the abatement catalyst. IR measurements could be calibrated based on thermocouples in such an example. $NO_x$ conversion data could substitute to infer the temperature based on conversion. In other words, any parameter that can be sensed, observed or otherwise used with a relationship or other computer model to determine, or at least approximate, the temperature of the exhaust gas 22 being introduced to a plurality of different locations of the catalytic bed 30. Based on this parameter, one or more of the flow controllers 46 can be controlled according to the method described herein to establish a substantially-uniform temperature profile across a surface of the catalytic bed 30. The temperature profile can achieve a desired mean, median or other temperature across the surface of the catalytic bed 30.

Figure 4:
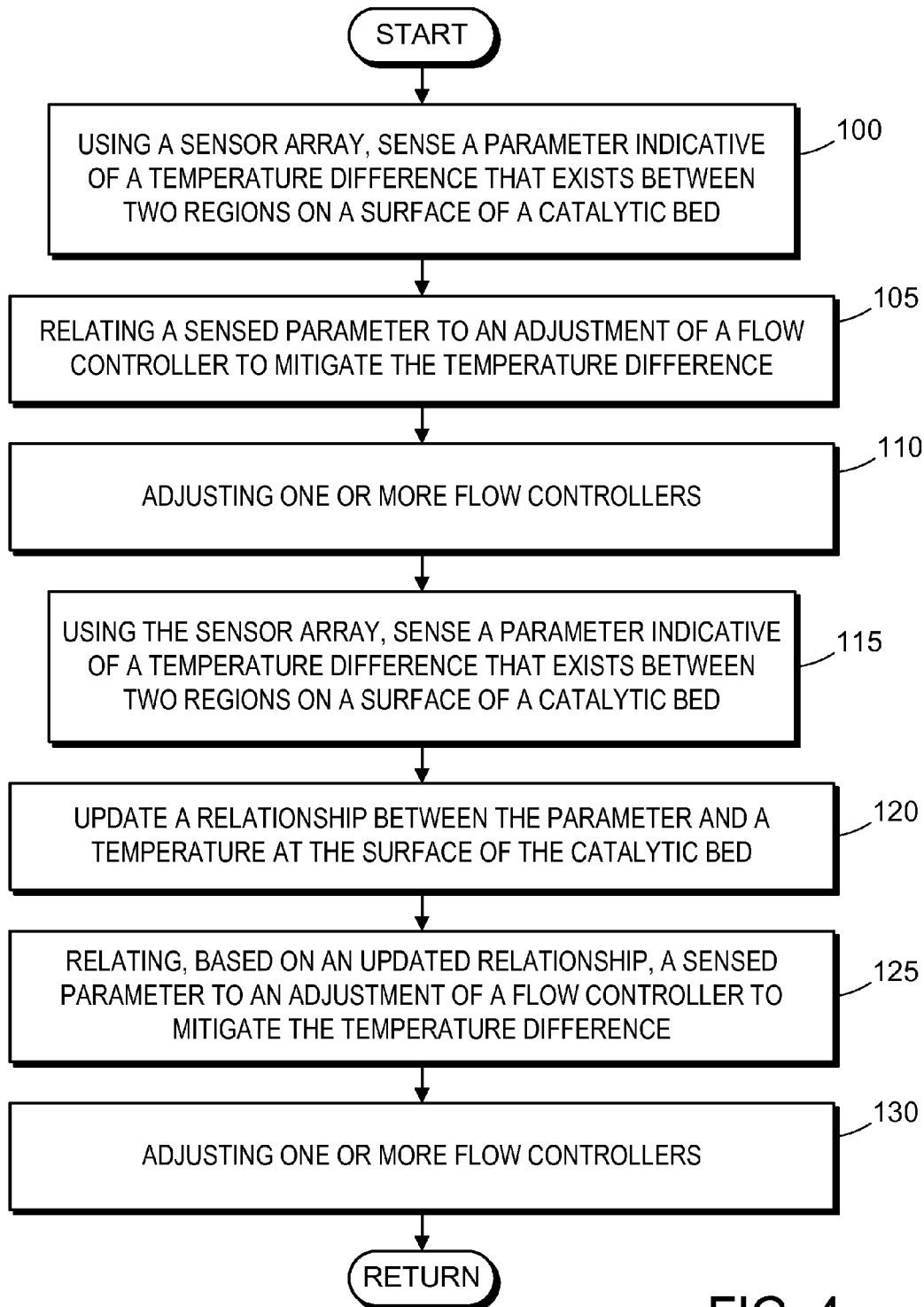
FIG. 4 is a top-level flow chart for an example embodiment of a method of promoting a substantially-uniform temperature across a catalytic surface in accordance with an aspect of the present invention.

A method for establishing a substantially-uniform temperature across a catalytic surface can be understood with reference to FIG. 4. To clearly describe the method, an example where adjustment of one or more flow controllers 46 is controlled by the controller 27 in an attempt to mitigate a temperature difference between two different regions of a surface of a catalytic bed 30 is described. Again, the method can also control adjustment of the one or more flow controllers 46 to establish the desired mean temperature of the exhaust gas 22 being introduced to the surface of a catalytic bed 30 towards a target temperature.

According to the method represented in FIG. 4, during operation of the engine 12, a temperature, concentration of combustion product, or other parameter is sensed by one or more sensors of the sensor array 50 at step 100. The temperature, concentration or other parameter sensed at step 100 is indicative of a temperature of the exhaust gas 22 being introduced to a plurality of different locations of the catalyst bed 30. The temperature of the exhaust gas 22 at these different locations can be utilized, based on the relationship or other computer model stored in the computer-readable memory 24, to determine whether a significant temperature difference exists between two or more different regions on a surface of one or more of the catalytic beds 30. For example, the temperature difference can be between two different regions of an exposed surface of the catalytic bed 30 that is closest to the intake manifold 26 along a path the flue gas travels upon entering the catalytic chamber 28.

A signal is transmitted from the one or more sensors of the sensor array 50 to be delivered to the controller 27. Using a relationship or other computer model stored in the computer-readable memory 24, the controller 27 can relate the parameter sensed at step 100 to an adjustment of one or more of the flow controllers 46 at step 105 that is believed will at least partially resolve the temperature difference between the different regions of the catalytic bed 30. The adjustment determined by the controller 27 at step 25 is aimed at adjusting the quantity, location, or a combination of quantity and location of tempering fluid introduced through one or more of the nozzles 44 to the flue gas 26 entering the catalytic system 24 through the intake manifold 26. Varying the quantity of, the location at which the tempering fluid is introduced to the flue gas, or a combination thereof, upstream of the catalytic beds 30 the controller 27 attempts to resolve, or at least mitigate the temperature difference of the flue gas being introduced to the two or more regions of the surface of the catalytic bed 30.

As a specific example, an elevated temperature sensed at step 100 in zone I (FIG. 3) by sensor 50a relative to another temperature sensed in zone III by sensor 50c. The temperatures sensed by sensors 50a and 50c can be traced back to the temperature in the regions on the surface of one or more of the catalytic beds 30 between which there is a temperature difference based on a computer model stored in the computer readable memory 42. For the present example, suppose the flow controller 46a is determined by the controller 27, executing computer-executable instructions, to be adjustable to resolve the sensed temperature difference at step 105 (FIG. 4). At step 110, adjustment of the flow controller 46a (FIG. 3) is initiated by the controller 27 according to the determination made at step 105 (FIG. 4) based on a relationship between the sensed temperature and the adjustment to be made. At least one of the parameter sensed by the sensors 50a and 50c (FIG. 3) and the adjustment to the flow controller 46a can be stored in the computer-readable memory 42.

Subsequent to adjustment of the flow controller at step 110, the sensor array 50 continues to monitor the parameter. At step 115 (FIG. 4) the sensor array 50 senses a change to the temperature difference determined to exist based on the temperatures sensed at step 100. The change can be a mitigation of the temperature difference, a worsening of the temperature difference, or a suitable resolution of the temperature difference for example. The parameter data sensed by the sensor array 50 (FIG. 3) subsequent to the previous adjustment of the flow controller 46a in the present example can also be stored in the computer readable memory 42. At step 120 (FIG. 4), the weighting factors, coefficients, and/or other portions of the computer model or other relationship used to relate the parameter sensed by the sensor array 50 to an adjustment of the one or more flow controllers 46 is updated based on the parameter sensed resulting in the previous adjustment of the flow controller 46a. In addition to the same parameter sensed at step 100 (FIG. 4), different parameters, or parameters in other zones I, II, III and IV can also be used to update the relationship depending on the result of the previous adjustment of the one or more flow controllers 46. The update to the model or other relationship can include a change to a weighting factor to be used in a calculation of the temperature difference at the surface of the catalytic bed 30, or any suitable update to the relationship based on prior results of adjustments to make future adjustments more likely to resolve the temperature difference, and optionally to promote a substantially-uniform temperature profile across the surface of the catalytic bed 30. The update to the relationship can also include factoring an effect the previous adjustment to the flow controller 46a had on the parameter in zones other than I and III.

Subsequent to updating of the relationship at step 120 (FIG. 4), the controller again relates the one or more parameters sensed at step 115 to a temperature difference between regions at the surface of the catalytic bed 30 (FIG. 3) at step 125.

The parameter sensed at step 115 is related at step 125 to an adjustment of one or more of the flow controllers 46 (FIG. 3), however, based on the relationship in the computer-readable memory 42, as updated at step 120 (FIG. 4). The adjustment of the flow controller(s) 46 (FIG. 3) determined at step 125 (FIG. 4) is automatically carried out by the controller 27 (FIG. 3) without operator intervention at step 130, and the process continues in an effort to achieve a substantially-uniform temperature of the flue gas being introduced across the surface of the catalytic bed 30. The process can also be performed to adjust the mean temperature of the flue gas introduced to various regions across the surface of the catalytic bed 30 toward a desired target temperature.

Figure 5:
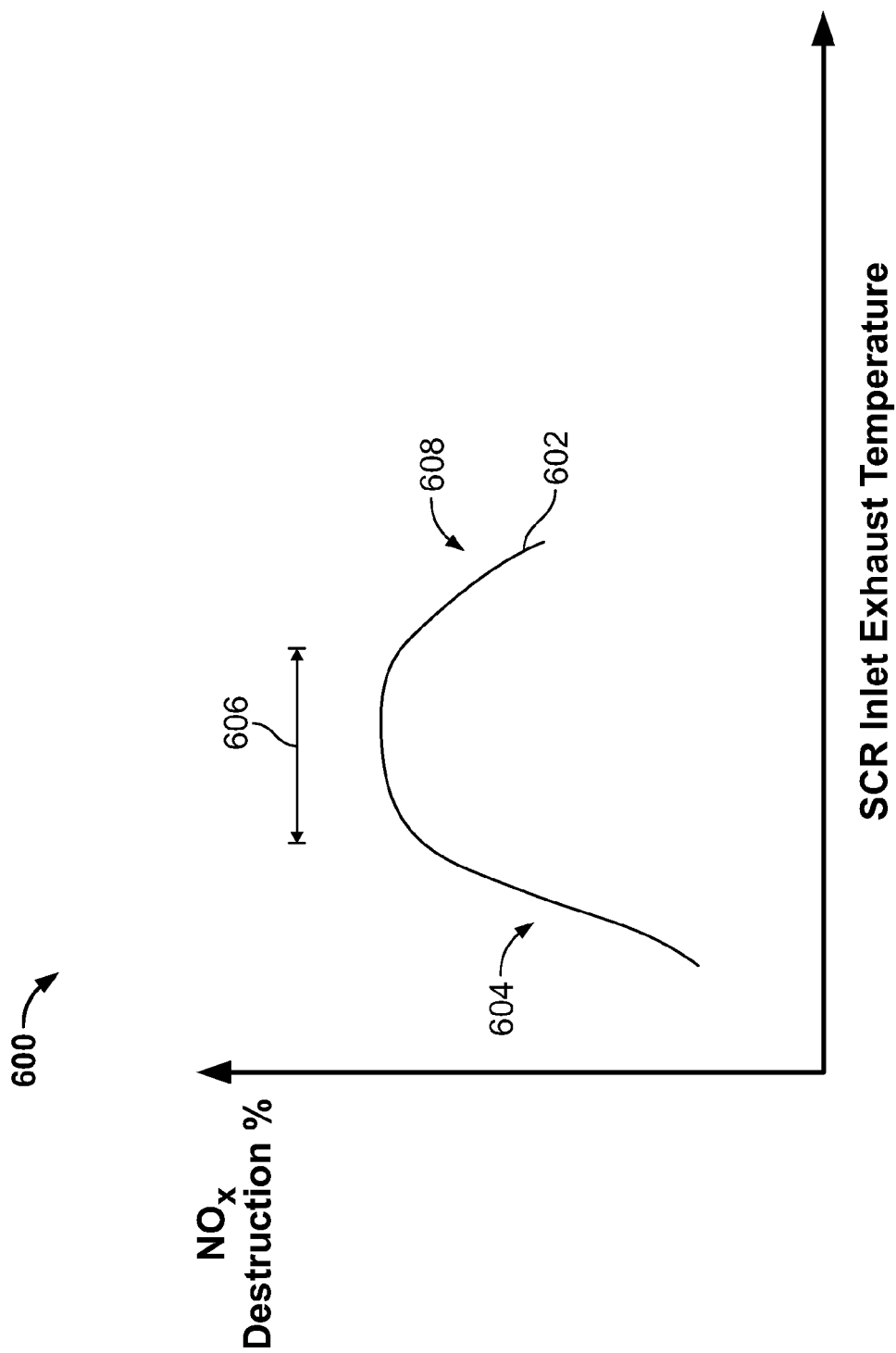
FIG. 5 provides an illustrative plot of $NO_x$ destruction versus a temperature of exhaust gas introduced to a surface of a catalytic bed.

FIG. 5 provides an illustrative plot 600 of $NO_x$ destruction versus the temperature of the exhaust gas 22 being introduced to the surface of the catalytic bed 30 in the example described above. The plot 600 also illustrates examples of a target temperature and target range of temperatures of the exhaust gas 22 being introduced to the surface of the catalytic bed 30 sought to be achieved across the surface of the catalytic bed 30 by the above method and system. As shown, a curve 602 represents the $NO_x$ destruction achieved when the exhaust gas 22 is introduced to the surface of the catalytic bed 30 at various temperatures. The curve 602 includes a low-temperature region 604 in which the temperature of the exhaust gas 22 being introduced to the catalytic bed 30 is lower than an optimal-temperature region 606 that is to be targeted by the method and system described above to reduce $NO_x$ emissions. In the low-temperature region 604, the temperature is below the reaction temperature required to maximize conversion of the combustion products in the presence of the catalytic bed 30 to reduce $NO_x$ emissions.

During operation of the engine 12 (FIG. 1) the temperature of the exhaust gas 22 (FIG. 3) tends to rise, eventually exceeding the optimal temperature region 606 (FIG. 5). $NO_x$ destruction in this high-temperature region 608 gradually diminishes, which is believed to be the result of excessive oxidation of the reducing agent such as ammonia, for example, promoted by the relatively high temperatures experienced in the high-temperature region 608 of the curve 602. The higher exhaust temperatures not only increase reducing agent oxidation over the catalyst, but eventually deactivate the catalyst. Again, like in the low-temperature region 604, $NO_x$ emissions exceed the levels that can be achieved in the optimal-temperature region 606. Accordingly, the system and method described herein is operable to adjust (spatially and temporally) the introduction of the tempering fluid to the exhaust gas upstream of the catalytic bed 30 to maintain a substantially uniform temperature across the surface of the catalytic bed 30. The temperature/range of temperatures targeted by the system and method described above promotes maximum $NO_x$ destruction occurring within the optimal temperature range 606 shown in the example of FIG. 5.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A method of controlling a temperature of an exhaust gas from a heat-producing device that is introduced to a catalyst of a catalytic system, the catalyst promoting a reaction to reduce an amount of a combustion product in the exhaust gas emitted to an ambient environment to a lesser amount than originally present in the exhaust gas when emitted from a combustion source of the heat-producing device, the method comprising:

providing, via at least one adjustable flow controller, an adjustable amount of a temperature tempering fluid to the exhaust gas prior to the exhaust gas being introduced to the catalyst so as to adjust the temperature of the exhaust gas prior to the exhaust gas being introduced to the catalyst, the exhaust gas to which the tempering fluid is provided being temperature-adjusted exhaust gas;

sensing, via at least one sensor, at least one parameter indicative of temperature of the temperature-adjusted exhaust gas being introduced to the catalyst;

using a fluid flow model and the at least one parameter to determine at least one adjustment of the at least one adjustable flow controller which adjusts the adjustable amount of the temperature tempering fluid provided to the exhaust gas and vary the adjustment of the temperature of the exhaust gas such that the temperature-adjusted exhaust gas has temperature adjustment toward a desired target temperature;

performing the at least one adjustment of the at least one adjustable flow controller to adjust the adjustable amount of the temperature tempering fluid provided to the exhaust gas; and updating the fluid flow model using the at least one parameter and the determined at least one adjustment of the at least one adjustable flow controller.

2. The method according to claim 1, wherein said step of performing the at least one adjustment of the at least one adjustable flow controller includes adjusting a flow rate of the temperature tempering fluid introduced at a first spatial location.

3. The method according to claim 1, wherein the at least one adjustable flow controller includes a plurality of adjustable flow controllers, each of the plurality of adjustable flow controllers providing a respective adjustable amount of the temperature tempering fluid to the exhaust gas prior to the temperature-adjusted exhaust gas being introduced to the catalyst, the at least one sensor includes a plurality of sensors, and each of the plurality of sensors sensing a respective parameter at a respective different location indicative of the temperature of the temperature-adjusted exhaust gas being introduced to a respective different region of the catalyst, wherein the method further includes:

providing the respective adjustable amount of the temperature tempering fluid to the exhaust gas via each of the plurality of adjustable flow controllers prior to the temperature-adjusted exhaust gas being introduced to the catalyst;

sensing the respective parameters at the respective different locations indicative of the temperature of the temperature-adjusted exhaust gas being introduced to the respective different region of the catalyst using the plurality of sensors;

using the fluid flow model and the respective parameters to determine at least one adjustment of the plurality of adjustable flow controllers which adjusts the adjustable amount of the temperature tempering fluid provided to the exhaust gas and vary the adjustment of the temperature of the temperature-adjusted exhaust gas such that the temperature-adjusted exhaust has temperature adjustment toward the desired target temperature;

performing the at least one adjustment of the plurality of adjustable flow controllers to adjust the adjustable amount of the temperature tempering fluid provided to the exhaust gas; and updating the fluid flow model using the respective parameters and the determined at least one adjustment of the plurality of adjustable flow controllers.

4. The method according to claim 3, wherein said step of performing the at least one adjustment of the plurality of adjustable flow controllers includes adjusting a flow rate the temperature tempering fluid introduced at a first spatial location of the exhaust gas relative to a flow rate of the temperature tempering fluid introduced to the exhaust gas at a second spatial location.

5. The method according to claim 1, wherein the at least one sensor includes at least one temperature sensor disposed to sense the temperature of the temperature-adjusted exhaust gas downstream of the catalyst.

6. The method according to claim 5, wherein the at least one temperature sensor is disposed to sense the temperature of the temperature-adjusted exhaust gas passing through one of a plurality of zones in a cross section of an outlet passage disposed downstream of the catalyst.

7. The method according to claim 6, wherein the step of using the fluid flow model and the at least one parameter to determine the at least one adjustment includes relating the temperature of the temperature-adjusted exhaust gas passing through the one of the plurality of the zones to the adjustment of the at least one adjustable flow controller.

8. The method according to claim 1, wherein the at least one sensor also senses concentration of combustion product downstream of the catalyst.

9. The method according to claim 8, wherein the at least one sensor that also senses concentration of combustion product senses the concentration of combustion product that is passing through one of a plurality of zones in a cross section downstream of the catalyst.

10. The method according to claim 9, wherein said wherein the step of using the fluid flow model and the at least one parameter to determine the at least one adjustment includes relating the concentration of the combustion product that is passing through one of the plurality of zones to the adjustment of the at least one adjustable flow controller.

11. The method according to claim 8, wherein the concentration of the combustion product that is sensed is an amount of NOx.

12. The method according to claim 1, wherein the tempering fluid includes air.

* * * * *